July 25, 1950  J. E. HATFIELD  2,516,571
MEANS FOR RELEASING A PARACHUTE FROM ITS PACK
Filed March 17, 1947  2 Sheets-Sheet 1
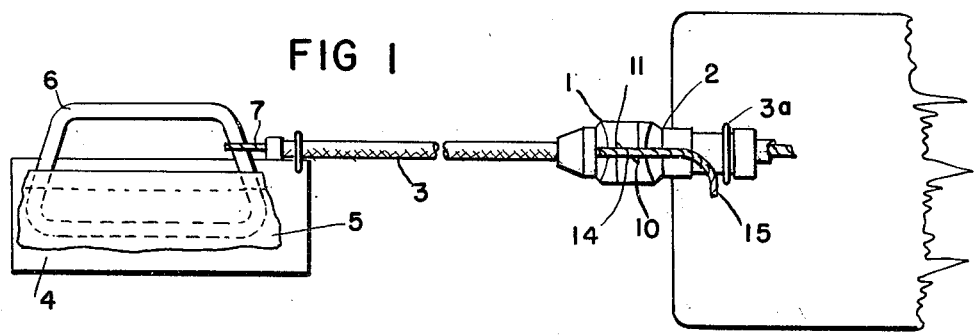
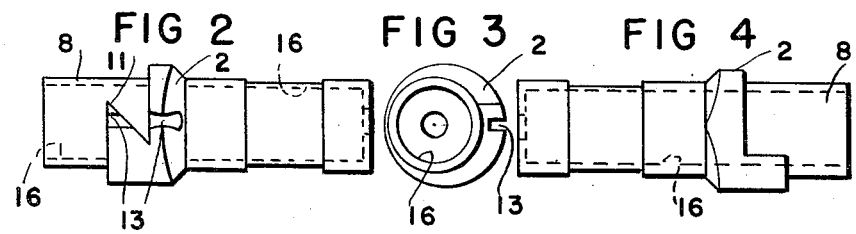
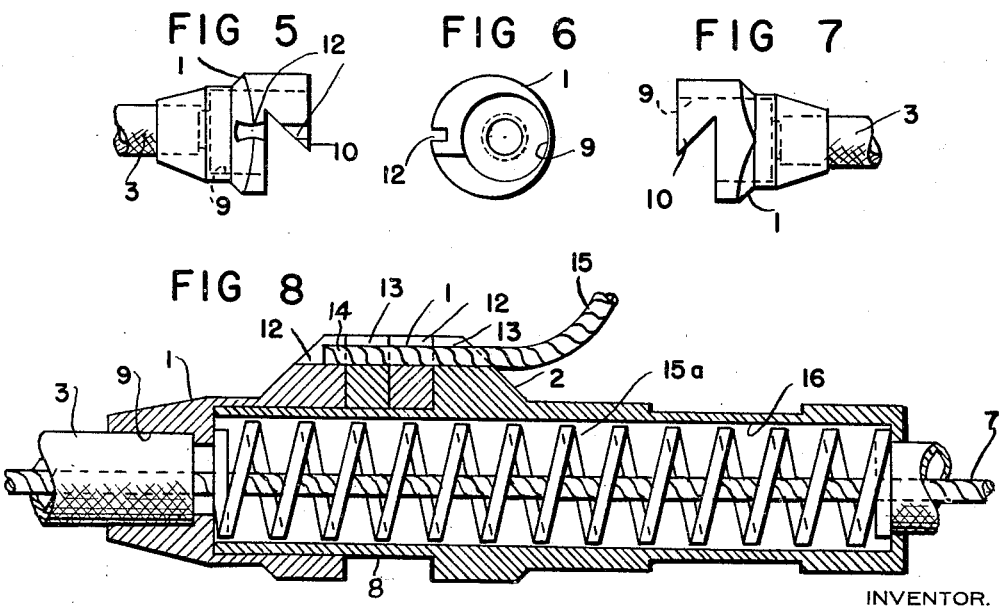
INVENTOR.
John E. Hatfield
ATTORNEYS.

July 25, 1950        J. E. HATFIELD        2,516,571
MEANS FOR RELEASING A PARACHUTE FROM ITS PACK
Filed March 17, 1947        2 Sheets-Sheet 2
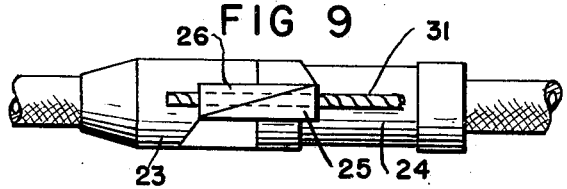
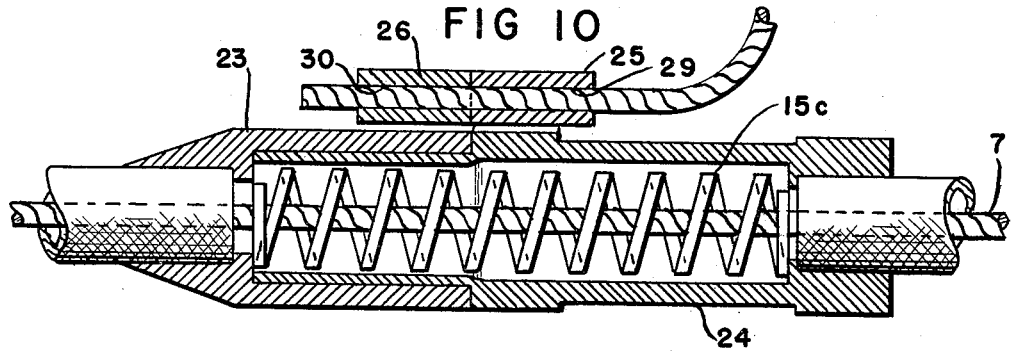
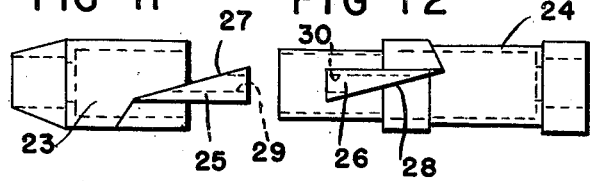
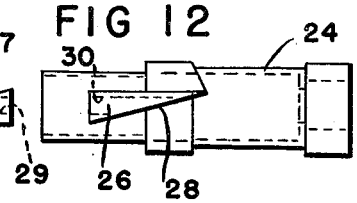
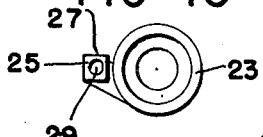
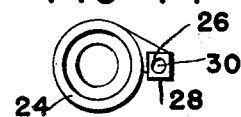
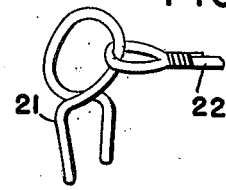
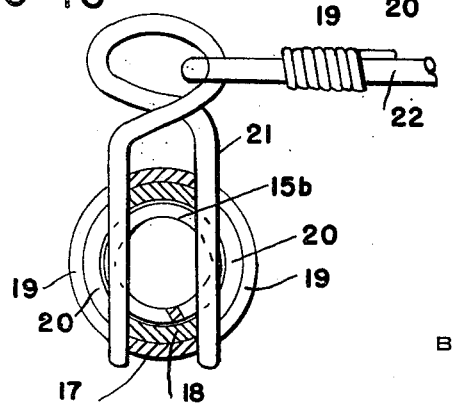
INVENTOR.
John E. Hatfield
BY Lancaster, Allwine & Rommel
ATTORNEYS.

Patented July 25, 1950

2,516,571

UNITED STATES PATENT OFFICE 2,516,571

MEANS FOR RELEASING A PARACHUTE FROM ITS PACK

John Edward Hatfield, Letchworth, England, assignor to Irving Air Chute Co. Inc., Buffalo, N. Y., a company of New York Application March 17, 1947, Serial No. 735,094
In Great Britain July 11, 1945

Section 1, Public Law 690, August 8, 1946
Patent expires July 11, 1965

9 Claims. (Cl. 244—149)

This invention relates to improvements in or relating to means for releasing a parachute from its pack.

The closure of parachute packs is customarily effected by providing on the flap or flaps, grommets, eyelets or the like, adapted to pass over cones or studs provided on the opposite co-operating flap or flaps, said cones being pierced transversely to receive locking pins, thereby holding the grommets in position on the cones against the tension of elastics provided on the pack. On the withdrawal of said pins the grommets due to the pull of the elastics override the cones, the flaps are pulled apart and the parachute canopy is released. In a pack of this kind it has been proposed to effect withdrawal of said locking pins either manually by a rip-cord or cable one end of which is provided with a rip-cord handle or ring, and the other detachably associated with the locking pins; or by "static" line, one end of which is provided with means for ready attachment to a point in the aircraft, and the other also detachably associated with the locking pins of the pack.

Such a pack is described in U. S. Pat. 2,100,693 in which the detachable association of both manually operated rip-cord and "static" line is effected by the intermediary of a travelling block having longitudinal movement within a channel or casing secured to the pack. The travelling block is grooved to receive both the manually actuated and the automatically actuated cables, the end of each of which is provided with a stop or stud to engage the end wall of the travelling block, the walls of said channel preventing the lateral dissociation of the manually and automatically operated cables until the block has been withdrawn beyond the confine of said channel when both ends are freed from said grooves. The travelling block is integrally connected by a cable to the locking pins, the length of said channel or casing being of course determined by the extent of movement of the cable required to withdraw the locking pins from their locking position. By this means the manually operated and the automatically operated cables are substantially simultaneously disconnected from the pack as the locking pins are withdrawn.

Due to its simplicity of construction and operation, the above described known device possesses many advantages more particularly when applied to the customary standard form of rigid pack. In other types of pack however, such for instance as the comparatively flexible elongated type, in order to prevent accidental withdrawal of the locking pins from the cones due to movement resulting from longitudinal distortion of the pack it is necessary for the cable connecting the pins to the controls to be sufficiently lengthened to take up such movement without effecting the withdrawal of the pins. For this purpose the length of the connecting cable between the cones must be slightly in excess of the actual distance between said cones. It follows that in the application of the said known device the channel enclosing the travelling block must be correspondingly lengthened. The device therefore designed for one type of pack is not always suitable for being applied to another.

One of the objects of the present invention is to provide improved parachute-releasing means adapted to operate satisfactorily on packs of various kinds and a further object is to provide means which can, if desired, be applied to existing packs having manually operable releasing means for the purpose of converting such packs into ones adapted for manual and automatic control.

Parachute releasing means according to the present invention comprise a cable and a housing through which said cable is adapted to extend wherein said housing is formed in two parts, a spring is provided for urging said parts in a separating direction and thereby increasing the effective length thereof, and a locking device is provided for normally preventing the separation of said two parts, said cable being movable in a parachute-releasing direction either by a direct pull on the cable or by freeing the said locking device and thereby allowing the spring to separate the two parts of the housing.

Releasing means according to the present invention may be applied to a parachute pack in such a way that freeing of the aforesaid locking device and the resultant indirect movement of the cable is effected by operation of a manual control, e. g. a rip-cord and associated rip-ring or handle, and direct movement of the cable is effected automatically e. g. by means of a static line, a time-controlled device or a barometrically controlled device, or alternatively the indirect movement of the cable may be subject to the said automatic control and the direct movement to the said manual control.

The aforesaid housing may comprise two telescopically disposed parts or it may comprise two parts adapted to abut against one another with or without telescopic engagement of other portions of such parts. In the latter arrangements the abutting faces may be provided with ratchetlike notches, teeth, inclined projections or the like which result in there being relative rotation between the two parts pursuant to such parts being separated longitudinally and the locking device may be adapted to prevent such rotary movement and thereby prevent said separation in an indirect manner instead of being disposed for positively preventing said separation in a direct manner. In general we prefer to adopt an arrangement wherein the locking device prevents the separation of the parts of the housing in an indirect manner and in such a way that the force to which the locking device is subjected when the parts are assembled is only a component of the force exerted by the said spring.

The aforesaid two-part housing may be incorporated between two lengths of a flexible tube constituting a guide and enclosure for the said cable or the part of the said housing adjacent to the parachute pack may be permanently mounted thereon and/or the the part remote from the pack may be directly associated with another part of the release mechanism e. g. the rip-cord, handle or ring. It is also within the scope of the present invention to mount both of said parts in direct association with the rip cord handle and pack without the intermediary of any flexible tube.

The aforesaid locking device may consist of or include one or more pins, spring clips or the like and in some cases such device may consist of the soldered or otherwise consolidated end of a multi-stranded cable. Such locking device or a part associated therewith may be adapted to extend through apertures, slots or the like in the respective parts of the housing or only one of such parts may be slotted and the locking device or a part associated therewith may be adapted to abut against the other part of the housing.

In order that the present invention may be well understood I will now describe by way of examples only, some specific embodiments thereof in application to a pack of the kind having flaps which are secured together by inter-engaging cones and eyelets in conjunction with locking pins adapted to be passed through transverse holes in said cones, said locking pins being secured to a cable hereinafter called a "rip-cord," and reference will be made to the accompanying drawings in which:

Figure 1 is a front elevation of one arrangement.

Figure 2 is a front elevation of one part of the two-part housing shown in Figure 1.

Figure 3 is an end view of the part shown in Figure 2.

Figure 4 is a rear elevation of the part shown in Figure 2.

Figure 5 is a front elevation of the other part of the two-part housing shown in Figure 1.

Figure 6 is an end view of the part shown in Figure 5.

Figure 7 is a rear elevation of the part shown in Figure 5.

Figure 8 is a longitudinal cross sectional view thru the assembly of the form shown in Figure 1.

Figure 9 is a front elevation of another form of two-part housing in an engaged condition.

Figure 10 is a longitudinal cross sectional view thru the assembly of the form shown in Figure 9.

Figure 11 is a front elevation of one part shown in Figure 9.

Figure 12 is a front elevation of the other part shown in Figure 13.

Figures 13 and 14 are respectively end views of the parts shown in Figures 11 and 12.

Figure 15 is a front elevation of a modified form of two part housing in separated condition.

Figure 16 is a cross sectional view taken thru the locking or fastening device for holding the two parts of Figure 15 together with the spring pressed therebetween.

Figure 17 is a perspective view of the locking or fastening device shown in Figures 15 and 16.

Referring to Figures 1 to 8, the device includes a two-part housing comprising tubular members 1 and 2, the part 1 being anchored to one end of a flexible sheet 3 and the part 2 being anchored to the parachute pack as at 3ª. The opposite end of the sheath 3 is anchored to the pad or pocket mounting member 4, in conventional manner, as by stitching, such as shown in Fig. 9 of U. S. Pat. 1,842,723 or in U. S. Pat. 2,100,693, which is in turn secured to the harness and such pad includes a pocket 5 for a rip ring 6. The said rip ring is coupled to a rip cord 7 which passes through the sheath 3 and through the tubular members 1 and 2 and forms or carries the pins or the like for securing the parachute pack in a closed condition.

The part 2 of the said housing has a cylindrical portion 8 adapted to be telescopically received by the socket portion 9 of the part 1, the wall of the said socket portion 9 being partially cut away so as to form a tooth 10 and a complementary tooth 11 being formed on the wall of the said cylindrical portion 8. The said two parts 1 and 2 can accordingly be moved to their innermost positions providing their relationship is such that the tooth 11 clears the tooth 10 but if said two parts are urged together and relatively rotated so that the teeth 10 and 11 engage one another as shown in Figure 1 then separation of the two parts is prevented unless rotation is also permitted.

A slot 12 extends across the tooth 10 and the aligned radially projecting portion of the part 1 and a slot 13 extends across the tooth 11 and the aligned radially projecting portion of the part 2, said two slots being in alignment when the parts 1 and 2 are in their fully engaged positions. These slots are adapted to receive a locking pin 14 which is carried by or formed by the end of a subsidiary rip cord or static line 15.

A strong spiral spring 15ª is provided for insertion in the hollow interiors 9 and 16 of the parts 1 and 2, such spring preferably being made from spring steel of flat rectangular cross-section so, as shown in Figure 8, that in a fairly short length of spring there can be a big difference between its fully compressed and its fully expanded conditions, it being desirable for instance to employ a spring which whilst being capable of being compressed say to a length of about 2½" will expand to a length of say nine inches upon being freed.

When assembling the above described device the rip cord 7 is passed through the sheath 3, through the part 1 of the housing, and then through the above mentioned spring and the part 2 of the housing and the parts 1 and 2 are urged together into the positions shown in Figure 1 thus compressing the said spring, as shown in Figure 8. The locking pin or detent member 14 is then inserted in the slots 12 and 13 so securing all of the parts in their assembled condition. The spring of course tends to urge the parts 1 and 2 away from one another so generating a tendency for relative rotary movement, and the latter is resisted by the pin 14. In order to prevent inadvertent withdrawal of the pin 14 the aforesaid slots 12 and 13 are preferably of wedge-like cross-section as shown in Figures 3 and 6.

Assuming that the above described device is in use the subsidiary rip cord 15 is connected to the static line or other automatically operated control device and the release of the parachute from the pack concerned can then be effected either by pulling on the rip ring 6 or automatically by a pull on the subsidiary rip cord 15, the effect of a pull on the said subsidiary rip cord being to withdraw the pin 14 whereupon the parts 1 and 2 are freed for relative rotation and the above mentioned spring urges such parts away from one another. The expansion of the spring causes the sheath 3 to bow laterally. The distance between the member 2 and the point at which such sheath is anchored in the vicinity of the rip ring 6 measured along the bowed line of the sheath and core is increased by the degree of expansion of the spring e. g. a distance of say between six and seven inches. This expansion effects a corresponding withdrawal movement of the rip cord 7 through the part 2 of the housing and so effects release of the parachute. The equipment therefore provides for (a) automatic release alone, (b) normal release alone or (c) dual release as may be desired, and in the case of dual release the alternative form of release is available in the event of one failing e. g. if the pin 14 should become jammed the manual release is not thereby affected.

In a modification of the arrangement shown in Figures 1 to 4 the part 1 of the two-part housing may be secured directly to the pack or to a part which has a fixed position with respect thereto such for instance as the pocket 5 and may cooperate directly with the rip ring 6 or with an abutment on the rip cord 7.

In the arrangement shown in Figures 15, 16 and 17 the two-part housing comprises two tubular parts 17 and 18 adapted to be telescoped together and to enclose a spiral spring 15b but for the purpose of locking these parts together they are provided with slots 19 and 20 respectively which when the parts are fully engaged are aligned and adapted to receive the legs of a substantially U-shaped locking clip 21, such clip being carried by the subsidiary rip-cord 22. In this arrangement the spring pressure is applied directly to the U-shaped clip and in some respects therefore it is not so satisfactory as the earlier described arrangement where the force applied to the locking pin is only a component of the force exerted by the spring.

In the arrangement shown in Figures 9 to 14 the device again comprises a two-part housing, i. e. tubular parts 23 and 24 which are adapted to telescope together and form a housing for a spiral spring 15c. These parts 23 and 24 are provided with radially projecting lugs 25 and 26 respectively which register with one another when the parts are assembled and the opposed faces 27 and 28 of the said lugs are inclined to the longitudinal axis of the housing. Apertures 29, 30 are provided in the lugs 25 and 26 such apertures being aligned when the parts are fully assembled and adapted to receive a locking pin, carried by or formed by the end of the subsidiary rip cord 31. In this arrangement the locking pin is only required to withstand a component of the force exerted by the compression spring.

It will of course be understood that in the arrangement shown in Figures 9 to 14 the lugs may be slotted for receiving a locking pin i. e. in the manner described with reference to Figures 1 to 4 and that in the latter arrangement apertures instead of slots may be provided for such pin. In general I prefer however wherever possible to employ open slots as this ensures that the locking pin can be withdrawn irrespective of the direction in which a pull may be exerted thereon.

It will also be understood that in all of the above arrangements instead of the so-called locking pin being associated with the automatic control, e. g. a static line 15, it may be associated with the manually controlled rip cord and a direct pull on the parachute release pins may be exerted by the operation of the automatically controlled means e. g. a pull on a static line.

Whilst I have hereinbefore described some embodiments of the present invention I wish to be understood that there may be various changes without departing from the scope of such invention. Thus for instance there may be variations in the means employed for effecting interlocking between the two parts of the two-part housing and one of such parts may abut against or be formed integrally with a part secured to the rip-cord e. g. the rip-ring or handle, i. e. there need be no intervening flexible housing. It is also to be understood that instead of employing a single spring for urging the two parts of the housing in a separating direction we may employ a plurality of springs.

I claim:

1. In combination with a parachute pack having fastening means including a flexible rip cord, a flexible sheath thru which the rip cord slidably extends, and releasing means to cause the sheath to flex and the rip cord to flex and thereby forcibly pull the rip cord for opening the fastening means of the parachute pack.

2. In combination with a flexible parachute rip cord, operating means for pulling the rip cord comprising a multiple part tubular housing into which the rip cord slidably extends, expansible means associated with the multiple part housing to normally cause movement of the housing parts away from each other, means associating said housing parts with the rip cord so that upon movement of the parts relatively away from each other the rip cord will be moved with one of said parts, and releasable fastening means to hold said two parts together with the expansible means under compression.

3. In a rip cord pulling device the combination of a two part tubular housing, a rip cord operatively disposed within said parts, means formed upon said housing parts to prevent longitudinal relative movement thereof unless relatively rotated to a predetermined degree, expansible rip cord operating means within said housing parts, and releasable detent means normally preventing rotation of the multiple part housing.

4. In a rip cord pulling device the combination of a two part tubular housing having a rip cord receiving passageway therethru, means formed upon said housing parts to prevent longitudinal relative movement thereof unless relatively rotated to a predetermined degree, expansible means within said housing parts, and releasable detent means normally preventing rotation of the multiple part housing including a static line.

5. In release mechanism for parachute packs the combination with a parachute pack having fastening means including a flexible rip cord, a two part tubular housing through each of which the rip cord freely and slidably extends, means to prevent appreciable relative movement between one part and the pack, expansible means in the tubular parts of the housing normally tending to force them apart, and releasable detent means holding the two parts together with the expansion means compressed therein.

6. In release mechanism for parachute packs the combination with a parachute pack having fastening means including a flexible rip cord, a two part tubular housing into which the rip cord slidably extends, means to prevent appreciable relative movement between one part and the pack, expansible means in the parts of the housing normally tending to force them apart, releasable detent means holding the two parts together with the expansion means compressed therein, a flexible sheath thru which the rip cord extends connected to that part of the tubular housing which moves under expansion of the expansible means, and a rip cord handle connected to the flexible rip cord beyond the end of said sheath remote from said two part housing.

7. In parachute rip cord pulling mechanism the combination of a pair of tubular housing parts having passageways therethrough, a rip cord slidably disposed within the passageways, inter-engaging cam means for the adjacent ends of said housing parts requiring a predetermined degree of turning movement to effect longitudinal separation of said parts, said parts having complementary aligning recesses therein, releasable detent means seating in said recesses normally preventing turning of the parts and separation thereof, and rip cord operating expansion means between said parts normally tending to forcibly separate said parts.

8. In parachute rip cord pulling means the combination with a parachute rip cord of telescopically disposed housing parts thru which the rip cord is slidably disposed, inter-communicating recesses associated upon said parts, releasable detent means for seating in said recesses to hold the parts together against separation, and rip cord operating expansion means normally maintained compressed by the assembled parts and in position to forcibly separate said parts upon release of the detent means in order to operate the rip cord.

9. In combination with a parachute pack having fastening means, a flexible rip cord for operative association with said fastening means, a mounting member, a handle connected to the rip cord, a pocket on the mounting member for releasably securing the handle therein, a two part tubular housing, detent means to releasably hold the housing parts in assembled relation, a spiral compression spring within the tubular housing parts maintained under compression when the housing parts are assembled, means connecting one of said housing parts to a parachute pack against appreciable endwise movement with respect thereto, a flexible sheath secured to the other of the housing parts and remote therefrom secured to said mounting member, said rip cord freely slidably extending through said sheath and through the housing parts.

JOHN EDWARD HATFIELD.

REFERENCES CITED

The following references are of record in the file of this patent:

UNITED STATES PATENTS

| Number | Name | Date |
| --- | --- | --- |
| 279,267 | Nock | June 12, 1883 |
| 806,665 | Henderson | Dec. 5, 1905 |
| 867,312 | Schutz | Oct. 1, 1907 |
| 931,327 | Manzel | Aug. 17, 1909 |
| 1,138,465 | Fegley | May 4, 1915 |
| 1,171,380 | Arthur | Feb. 8, 1916 |
| 1,800,575 | Tofflemire | Apr. 14, 1931 |
| 1,944,795 | Lafayette | Jan. 23, 1934 |
| 2,100,693 | Irvin | Nov. 30, 1937 |
| 2,267,806 | Purdy | Dec. 30, 1941 |
| 2,353,440 | Bresee | July 11, 1944 |

FOREIGN PATENTS

| Number | Country | Date |
| --- | --- | --- |
| 17,888 | Great Britain | of 1910 |
| 585,265 | Great Britain | Feb. 3, 1947 |

Certificate of Correction

Patent No. 2,516,571 — July 25, 1950

JOHN EDWARD HATFIELD

It is hereby certified that error appears in the printed specification of the above numbered patent requiring correction as follows:

Column 4, line 55, after the syllable "tion" insert a comma; same line, before "as" strike out the word "so" and insert the same before "that", same line; column 6, line 19, after "wish" insert *it*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*